(12) United States Patent
Fukuda et al.

(10) Patent No.: US 11,979,312 B2
(45) Date of Patent: May 7, 2024

(54) NETWORK PATH SELECTION FOR COMMUNICATION DEVICES

(71) Applicant: Nippon Telegraph and Telephone Corporation, Tokyo (JP)

(72) Inventors: Aki Fukuda, Musashino (JP); Masatoshi Saito, Musashino (JP); Hirotaka Yoshioka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/012,404

(22) PCT Filed: Jul. 1, 2020

(86) PCT No.: PCT/JP2020/025919
§ 371 (c)(1),
(2) Date: Dec. 22, 2022

(87) PCT Pub. No.: WO2022/003881
PCT Pub. Date: Jan. 6, 2022

(65) Prior Publication Data
US 2023/0269170 A1 Aug. 24, 2023

(51) Int. Cl.
*H04L 45/12* (2022.01)
*H04L 45/122* (2022.01)
*H04L 45/24* (2022.01)

(52) U.S. Cl.
CPC .......... *H04L 45/123* (2013.01); *H04L 45/122* (2013.01); *H04L 45/24* (2013.01)

(58) Field of Classification Search
CPC ...... H04L 45/122; H04L 45/123; H04L 45/24
See application file for complete search history.

(56) References Cited

U.S. PATENT DOCUMENTS

| 10,588,069 | B1 * | 3/2020 | Chen | H04L 45/26 |
|---|---|---|---|---|
| 11,128,561 | B1 * | 9/2021 | Matthews | H04L 47/6255 |
| 2002/0051449 | A1 * | 5/2002 | Iwata | H04L 45/04 370/386 |
| 2014/0156822 | A1 * | 6/2014 | Choi | H04L 61/4511 709/223 |
| 2014/0286334 | A1 * | 9/2014 | Allan | H04L 45/12 370/389 |

(Continued)

OTHER PUBLICATIONS

Giatsios et al., "Design and evaluation of a hierarchical SDN control plane for 5G transport networks," International Conference on Communications (ICC) 2019, May 20, 2019, 6 pages.

*Primary Examiner* — Jeong S Park
(74) *Attorney, Agent, or Firm* — Fish & Richardson P.C.

(57) ABSTRACT

An end-to-end path can be set without providing a hierarchy in a control device of a multi-domain network. A path setting system (10) includes an orchestrator 200 and a control device (100). The orchestrator (200) generates path candidates corresponding to a line of domains through which paths that are candidates for a path pass and transmits the path candidates to control devices (100) of domains through which the path candidates pass to request setting of the path. The control device (100) acquires, from the control devices (100) of other domains through which path candidates pass, metrics of the path candidates in the domains, calculates total metrics, selects an optimum path, and sets the optimum path.

5 Claims, 7 Drawing Sheets

(56) References Cited

U.S. PATENT DOCUMENTS

2015/0032871 A1* 1/2015 Allan .................... H04L 47/125
709/223
2018/0254947 A1* 9/2018 Baj ..................... H04L 41/0894
2019/0222505 A1* 7/2019 Kaneko ................ H04L 45/122

* cited by examiner

| PATH | METRIC | KEY |
|---|---|---|
| N411,N412 | 100 | f34ad3 |
| N411,N413 | 200 | f34ad7 |
| N412,N413 | 100 | NULL |
| ... | ... | ... |

Fig. 5

| NODE | CONNECTION NODE | I/F | add/λ | STATE | |
|---|---|---|---|---|---|
| N412 | D420 | b01 | c3f2c7... | R | 148 |
| N411 | U453 | a03 | c353a8... | R | 149 |
| ... | ... | ... | ... | ... | |

NETWORK PATH SELECTION FOR COMMUNICATION DEVICES

CROSS-REFERENCE TO RELATED APPLICATIONS

This application is a National Stage application under 35 U.S.C. § 371 of International Application No. PCT/JP2020/025919, having an International Filing Date of Jul. 1, 2020. The disclosure of the prior application is considered part of the disclosure of this application, and is incorporated by reference in its entirety into this application.

TECHNICAL FIELD

The present invention relates to a path setting system, a control device, a program, and a path setting method for setting an end-to-end path across a plurality of domains.

BACKGROUND ART

A network may be composed of a plurality of domains (network domains) due to differences in geographical areas, adopted network technologies such as optical transmission/packet transfer (for example, Internet protocol (IP)), business/management entities, and the like. When such a network is used, it is necessary to set an end-to-end path (network path) across a plurality of domains.

As a method of setting a path in a network composed of a plurality of domains (multi-domain), there is a method of hierarchically disposing control devices below an orchestrator that receives a path setting request (refer to NPL 1). In this method, a higher-level control device (integrated control device) instructs a lower-level control device to set a path or performs arbitration between lower-level control devices to form a path. At the time of instructing a lower-level control device (domain control device) to set a path, the integrated control device requests setting on the basis of an interface, an application programming interface (API), or a data model suitable for the lower-level control device.

CITATION LIST

Non Patent Literature

[NPL 1] Dimitris Giatsios, et al., "Design and evaluation of a hierarchical SDN control plane for 5G transport networks," International Conference on Communications (ICC) 2019 IEEE, 2019.

SUMMARY OF THE INVENTION

Technical Problem

In the above-mentioned method of hierarchically disposing control devices to set a path, there is a concern that the number of functions of the integrated control device will increase due to an increase in the number of domains and diversification of network technology, which will become a bottleneck. In addition, there is a concern that it will be complicated to arrange demarcation points of management responsibility between the integrated control device and lower-level control devices.

The present invention has been made in view of such a background, and an object of the present invention is to allow an end-to-end path to be set without providing a hierarchy in control devices of a multi-domain network.

Means for Solving the Problem

To solve the aforementioned problem, a path setting system according to the present invention is a path setting system including: an orchestrator that receives a request for setting a path passing through a network composed of a plurality of domains, and control devices that control the domains, wherein the orchestrator includes: a path candidate generation unit that generates path candidates corresponding to a line of the domains through which paths that are candidates for the path pass; and a request transmission unit that transmits the path candidates to control devices of domains through which the path candidates pass to request setting of the path, and each of the control devices includes: a storage unit that stores a metric database in which a metric between two nodes among nodes within the host domain, which are connected to other domains, and nodes which are end points of the path is stored; a request reception unit that receives a request from the request transmission unit; a metric request unit that requests a metric between the nodes through which the path candidates pass from the control device of each domain through which the path candidates pass; a metric response unit that responds to the request for the metric with the metric; a metric calculation unit that calculates total metrics of the path candidates; a path selection unit that selects an optimum path from the path candidates on the basis of the total metrics; and a path setting unit that sets the optimum path for nodes through which the optimum path passes.

Effects of the Invention

According to the present invention, it is possible to set an end-to-end path without providing a hierarchy in control devices of a multi-domain network.

DESCRIPTION OF EMBODIMENTS

Hereinafter, a path setting system for a network composed of multiple domains in a form (embodiment) for carrying out the present invention will be described. The path setting system includes an orchestrator and domain control devices. The orchestrator has connection information between domains. Upon receiving a path setting request, the orchestrator generates a candidate for domains through which a path passes (path-passing domains) from the connection information between the domains. The path-passing domains are a line of domains, in which adjacent domains are directly connected. Further, the first and last domains of the path-passing domains are domains that are end points of the path. There may be a plurality of candidates (also referred to as path candidates) for the path-passing domains. The orchestrator transmits the path-passing domains to control devices of domains included in the path-passing domains.

Each control device has a metric database that stores a metric between two nodes that are a node (communication device) that is an end point of a path in a domain and a node that is a connection point with another domain. The control device acquires a metric between nodes in the domain thereof from each domain included in path candidates and calculates a total metric of the path candidate (a total value of metric acquired from each domain included in the path-passing domains). The control device selects a path candidate (also referred to as an optimum path) having a smallest total metric, and when the optimum path passes through the host domain thereof, sets the optimum path to nodes in the host domain.

The path candidates are received from the orchestrator, and the control device of each domain calculates a metric, determines and sets an optimum path. After the orchestrator generates and transmits the path candidates, there is no exchange with the domain control device, and thus processing load is small. The control device acquires a metric of a path candidate in the corresponding domain from another domain (domain control device), but there is no other exchange and thus processing load is small. As a result, it is possible to set an optimum path without providing an integrated control device as in the prior art.

Configuration of Network

Figure 1:
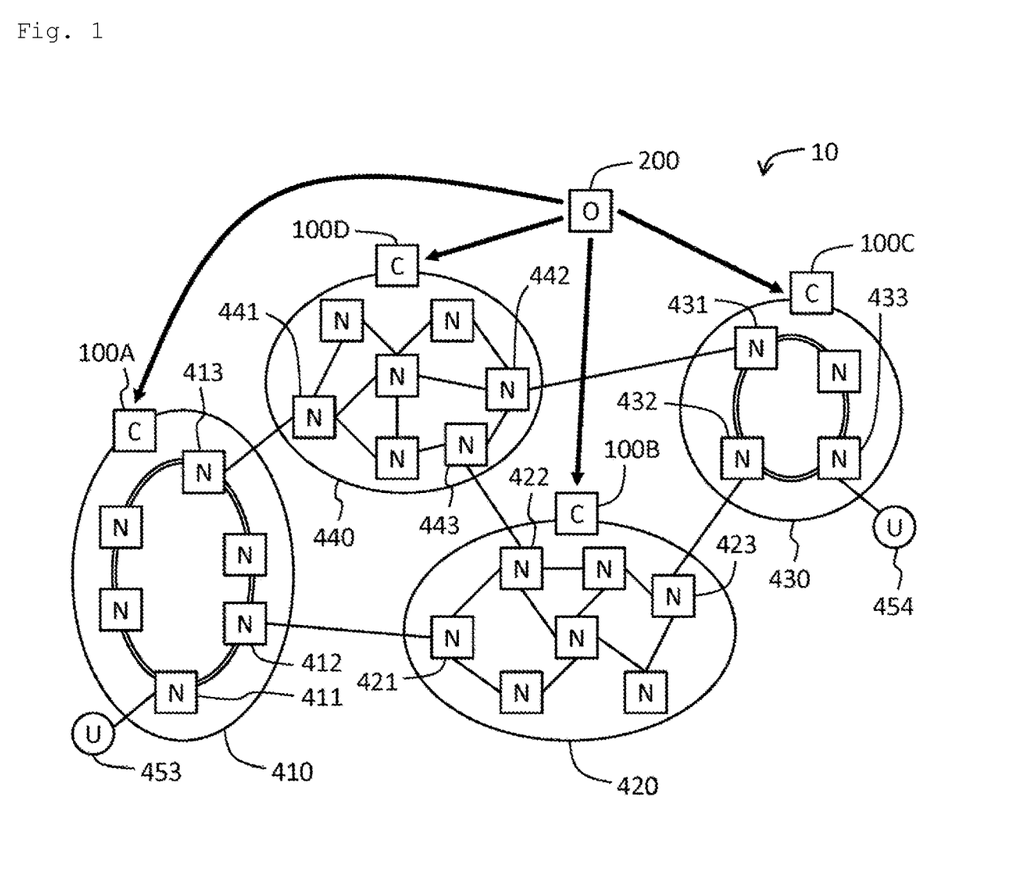
FIG. 1 is a configuration diagram of a path setting system according to the present embodiment and a network that is a setting target of the path setting system.

FIG. 1 is a configuration diagram of a path setting system 10 according to the present embodiment and a network that is a setting target of the path setting system 10. The path setting system 10 includes an orchestrator 200 and control devices 100A, 100B, 100C, and 100D. The control devices 100A, 100B, 100C, and 100D are collectively referred to as a control device 100.

The network is composed of domains 410, 420, 430, and 440. The domains 410 and 430 employ an optical transmission technology as a network technology, and nodes (denoted by N in FIG. 1) are connected in a ring shape therein. The domains 420 and 440 employ a packet transfer technology (for example, IP) as a network technology, and nodes are connected in a mesh shape therein.

The domains 410, 420, 430, and 440 are connected to adjacent domains via domain connection nodes. For example, the domains 410 and 420 are connected via nodes 412 and 421. Further, the domains 420 and 440 are connected via nodes 422 and 443. The domains 410 and 430 are not adjacent and are not directly connected. The domains 410 and 430 are connected via the domain 420 or the domain 430.

User bases 453 and 454 (denoted by U in FIG. 1) are bases (sites) of users who use the network and are respectively connected to nodes 411 and 433 which are user connection nodes. An example of a path connecting the user bases 453 and 454 will be described below. This path can be equated with a path connecting the nodes 411 and 433.

Configuration of Orchestrator

Figure 2:
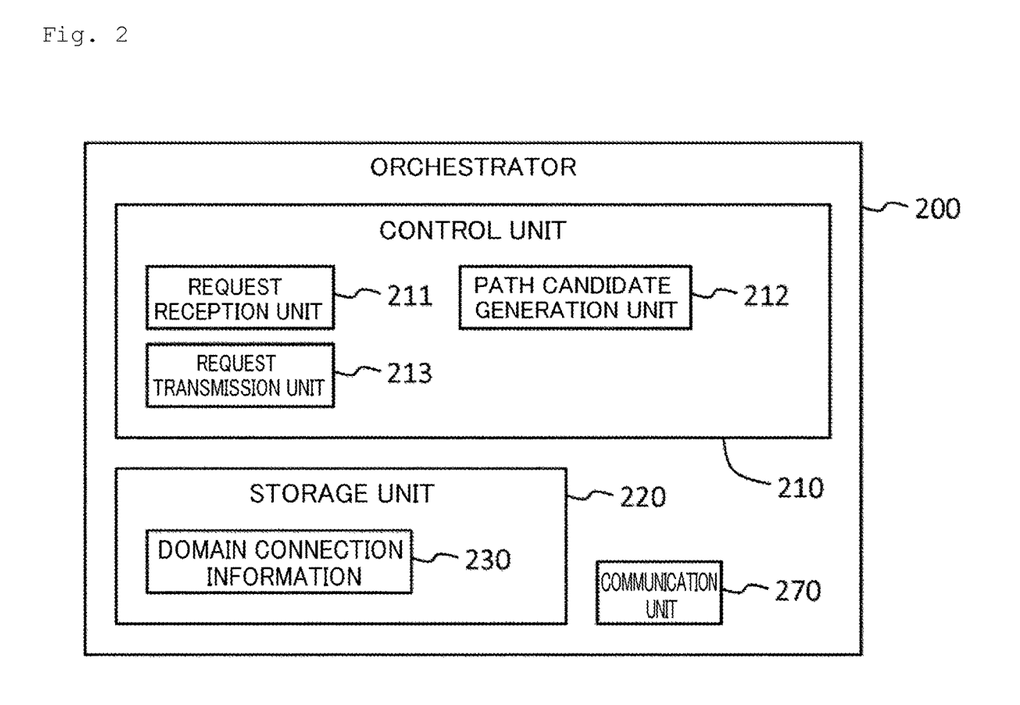
FIG. 2 is a functional configuration diagram of an orchestrator according to the present embodiment.

FIG. 2 is a functional configuration diagram of the orchestrator 200 according to the present embodiment. The orchestrator 200 includes a control unit 210, a storage unit 220, and a communication unit 270. The communication unit 270 transmits/receives communication data to/from other devices such as the control device 100.

The storage unit 220 is configured as a random access memory (RAM), a hard disk drive (HDD), a solid state drive (SSD), or the like. The storage unit 220 stores domain connection information 230 that is information on a pair of directly connected domains. In the example of the network shown in FIG. 1, pairs of the domains 410 and 420, the domains 410 and 440, the domains 420 and 430, the domains 440 and 430, and the domains 420 and 440 are stored in the domain connection information 230.

The control unit 210 is configured as a central processing unit (CPU) and includes a request reception unit 211, a path candidate generation unit 212, and a request transmission unit 213.

The request reception unit 211 receives a path setting request from a network user or administrators of the domains 410 and 430 to which the user bases 453 and 454 (refer to FIG. 1) are connected. The path setting request includes identification information of the domains 410 and 430 to which the user bases 453 and 454 are connected and the nodes 411 and 433 that are user connection nodes. The path setting request may further include the bandwidth and quality (delay, reliability, packet loss rate, and the like) of a path.

The path candidate generation unit 212 generates candidates (path candidates) for domains through which the path passes (path-passing domains). The path-passing domains are a line of domains, in which adjacent domains are directly connected. Further, the first and last domains of the path-passing domains are domains that are end points of the path, to which the user bases are connected. There may be a plurality of candidates (also referred to as path candidates) for the path-passing domains. In the example of FIG. 1, the path candidates are the domains 410, 420, and 430, and the domains 410, 440, and 430. The path candidates can be calculated from domains that are end points and pairs of directly connected domains stored in the domain connection information 230.

The request transmission unit 213 generates a shared key (a unique key, a random number, or the like) for each path candidate. Further, the request transmission unit 213 transmits the path candidates, a shared key, and identification information of the nodes that are the end points of the path to the control devices 100 of the domains included in the path candidates, and requests setting of the path. In the example of FIG. 1, two path candidates, two shared keys, and identification information of the nodes 411 and 433 are transmitted to the control devices 100A, 100B, 100C, and 100D.

Configuration of Control Device

Figure 3:
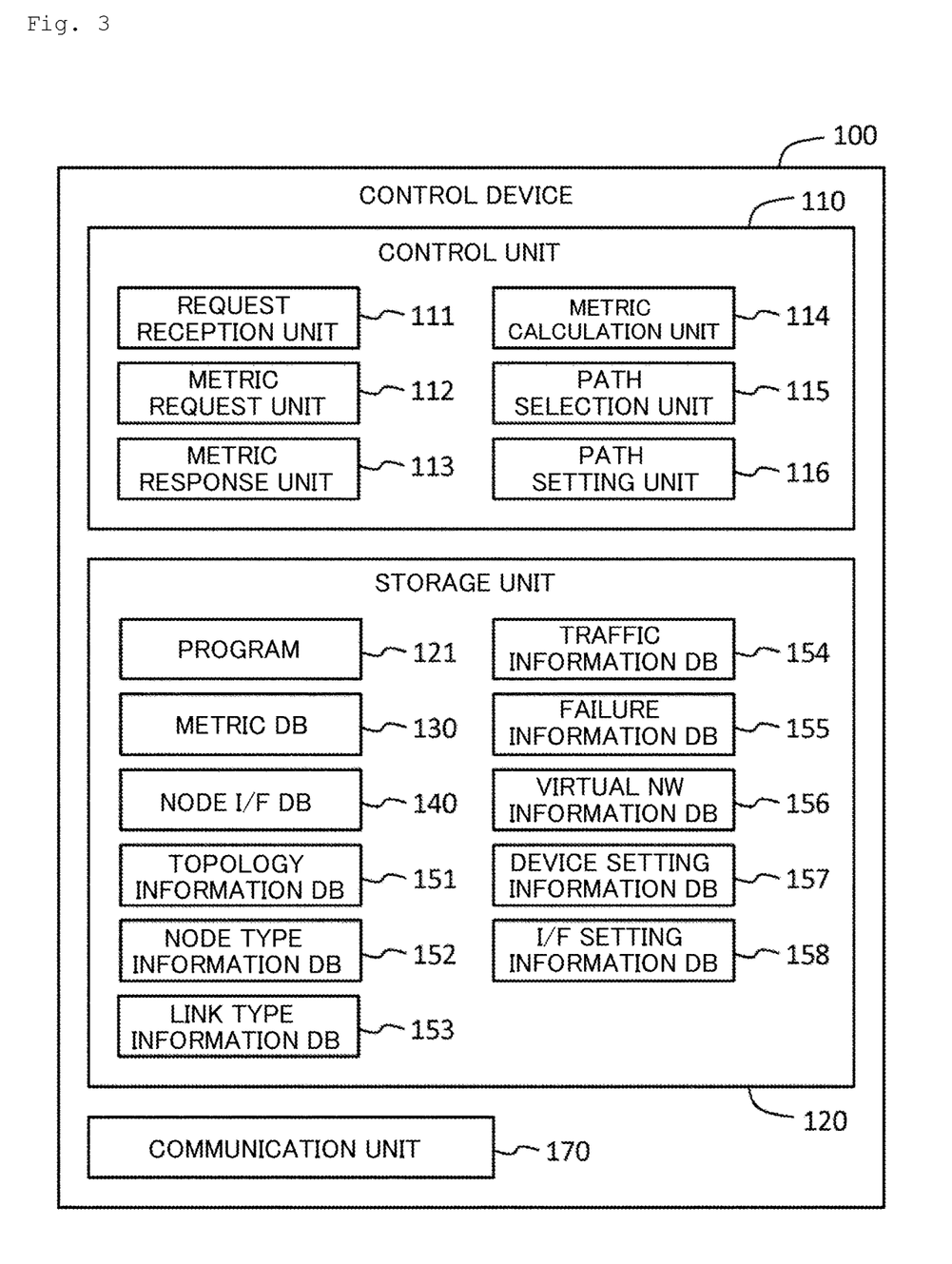
FIG. 3 is a functional configuration diagram of a control device according to the present embodiment.

FIG. 3 is a functional configuration diagram of the control device 100 according to the present embodiment. The control device 100 includes a control unit 110, a storage unit 120, and a communication unit 170. The communication unit 170 transmits/receives communication data to/from other devices such as the orchestrator 200 and nodes in the host domain thereof.

Configuration of Control Device: Storage Unit

The storage unit 120 is configured as a RAM, an HDD, an SSD, or the like. The storage unit 120 stores a program 121, a metric database 130 (denoted as a metric DB in FIG. 3), a node interface database 140 (denoted as a node I/F DB in FIG. 3), a topology information database 151 (denoted as a topology information DB in FIG. 3), a node type information database 152 (denoted as a node type information DB in FIG. 3), a link type information database 153 (denoted as a link type information DB in FIG. 3), a traffic information database 154 (denoted as a traffic information DB in FIG. 3), a failure information database 155 (denoted as a failure information DB in FIG. 3), a virtual network database 156 (denoted as a virtual NW information DB in FIG. 3), a device setting information database 157 (denoted as a device setting information DB in FIG. 3), and an interface setting information database 158 (denoted as an I/F setting information DB in FIG. 3).

The program 121 is a program for causing a computer to serve as the control device 100 and describes a procedure of processing executed by the control device 100 in path setting processing shown in FIG. 6 which will be described later.

Figure 4:
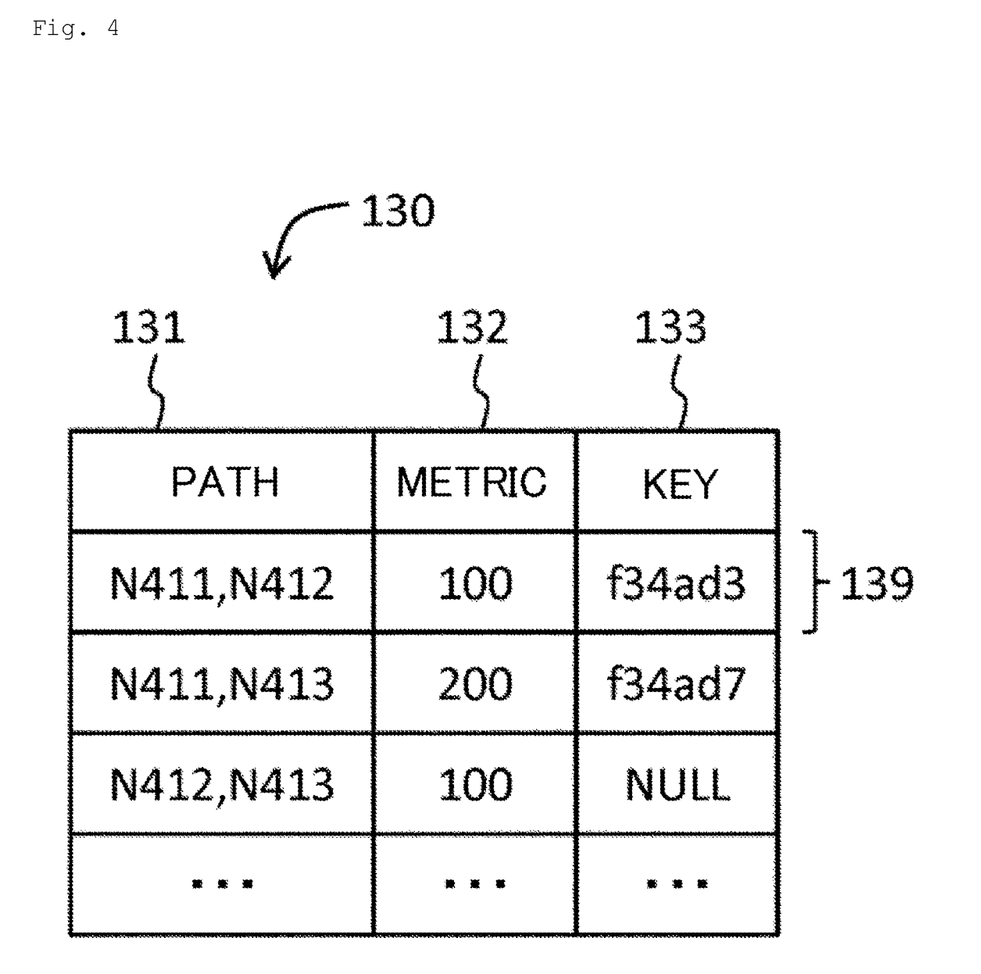
FIG. 4 is a data configuration diagram of a metric database according to the present embodiment.

FIG. 4 is a data configuration diagram of the metric database 130 according to the present embodiment. The metric database 130 is, for example, data in a table form and stores a metric of a path (path connecting nodes) in a domain between two nodes included domain connection nodes connected to other domains and user connection nodes connected to user bases. This path is a path (partial path) within a domain in a path requested by a user. A metric is a weight between nodes and is a value derived from, for example, the distance between nodes, the number of hops, a delay time, and the like, and a smaller metric is desirable in general.

Records (rows) of the metric database 130 include attributes (columns) of a path 131, a metric 132, and a key 133. The path 131 (partial path, path within a domain) includes two nodes (node identification information) that are endpoints of a partial path. The metric 132 is the metric of the path 131. The key 133 stores keys (shared keys) assigned to path candidates by the orchestrator 200 during path setting processing. A plurality of shared keys may be stored in the key 133.

In a record 139, a metric of a partial path having a node 411 with identification information of N411 and a node 412 with identification information of N412 as end points is 100, and a key of f34ad3 is currently assigned.

Figure 5:
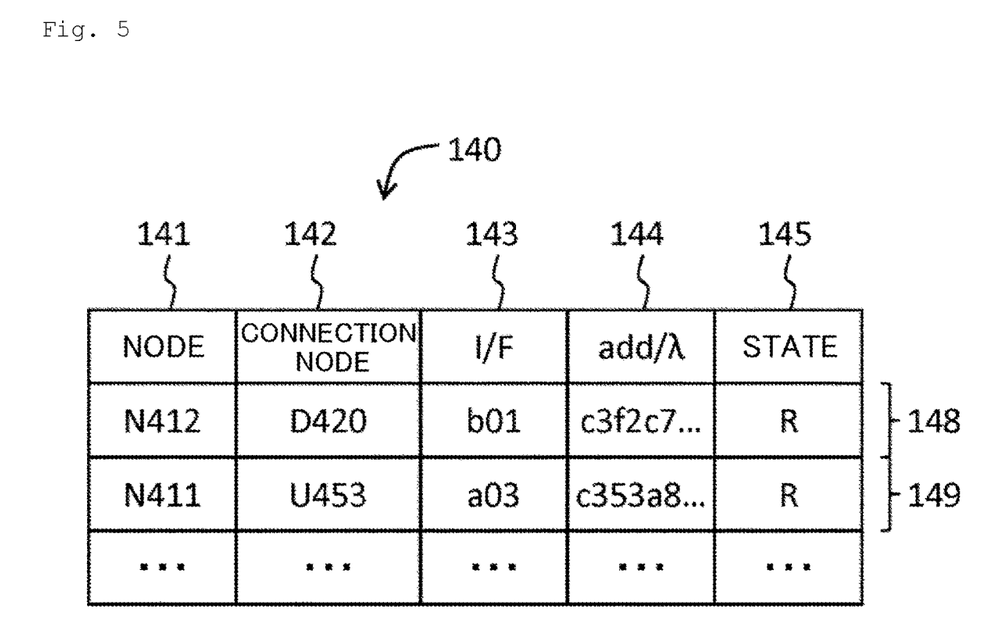
FIG. 5 is a data configuration diagram of a node interface database according to the present embodiment.

FIG. 5 is a data configuration diagram of the node interface database 140 according to the present embodiment. The node interface database 140 is, for example, data in a table form and stores information relating to interface of nodes in a domain. Records of the node interface database 140 include attributes of a node 141, a connection node 142, an interface 143 (denoted as I/F in FIG. 5), an address 144 (denoted as add/λ in FIG. 5), and a state 145.

The node 141 indicates a node (node identification information) including an interface. The connection node 142 indicates a user base or a domain that is a connection destination of an interface, or a node that is the connection destination. The interface 143 is interface identification information. The address 144 is an address or a wavelength assigned to an interface. The state 145 indicates a state of an interface, such as running (R) or down (D).

A record 148 indicates that a domain 420 (a domain connection node of the domain 420) is connected to an interface identified by b01 of a node 412 having identification information of N412 and is running. A record 149 indicates that a user base 453 is connected to an interface identified by a03 of a node 411 having identification information of N411 and is running.

Referring back to FIG. 3, the topology information database 151 stores topology information (connection information between nodes) in the domain. The node type information database 152 stores the types of nodes (an IP packet transfer device, an optical transmission device, and the like) in the domain. The link type information database 153 stores link bands. The traffic information database 154 stores statistical information on the amount of traffic passing through nodes or links. The failure information database 155 stores information related to failures that have occurred in nodes or links. The virtual network database 156 stores end points and addresses of virtual networks passing through the domain, and information related to an upper-layer protocol. The device setting information database 157 stores node setting information. The interface setting information database 158 stores a state (open/shut off) of an interface of a node.

Configuration of Control Device: Control Unit

The control unit 110 is composed of a CPU and includes a request reception unit 111, a metric request unit 112, a metric response unit 113, a metric calculation unit 114, a path selection unit 115, and a path setting unit 116.

The request reception unit 111 receives a path setting request from the orchestrator 200. The setting request includes path candidates and a shared key. The request reception unit 111 sets the shared key in the key 133 of the record of the metric database 130 corresponding to the path candidates.

The metric request unit 112 requests a metric of a partial path in another domain from the control device 100 of the other domain by designating a shared key.

The metric response unit 113 responds with a metric corresponding to the designated shared key.

The metric calculation unit 114 calculates a total metric of an entire path from the metric of the partial path.

The path selection unit 115 selects one path (optimum path) from the path candidates on the basis of the total metric of the entire path.

The path setting unit 116 performs settings for configuring the optimum path for the nodes in the domain.

Path Setting Processing

Figure 6:
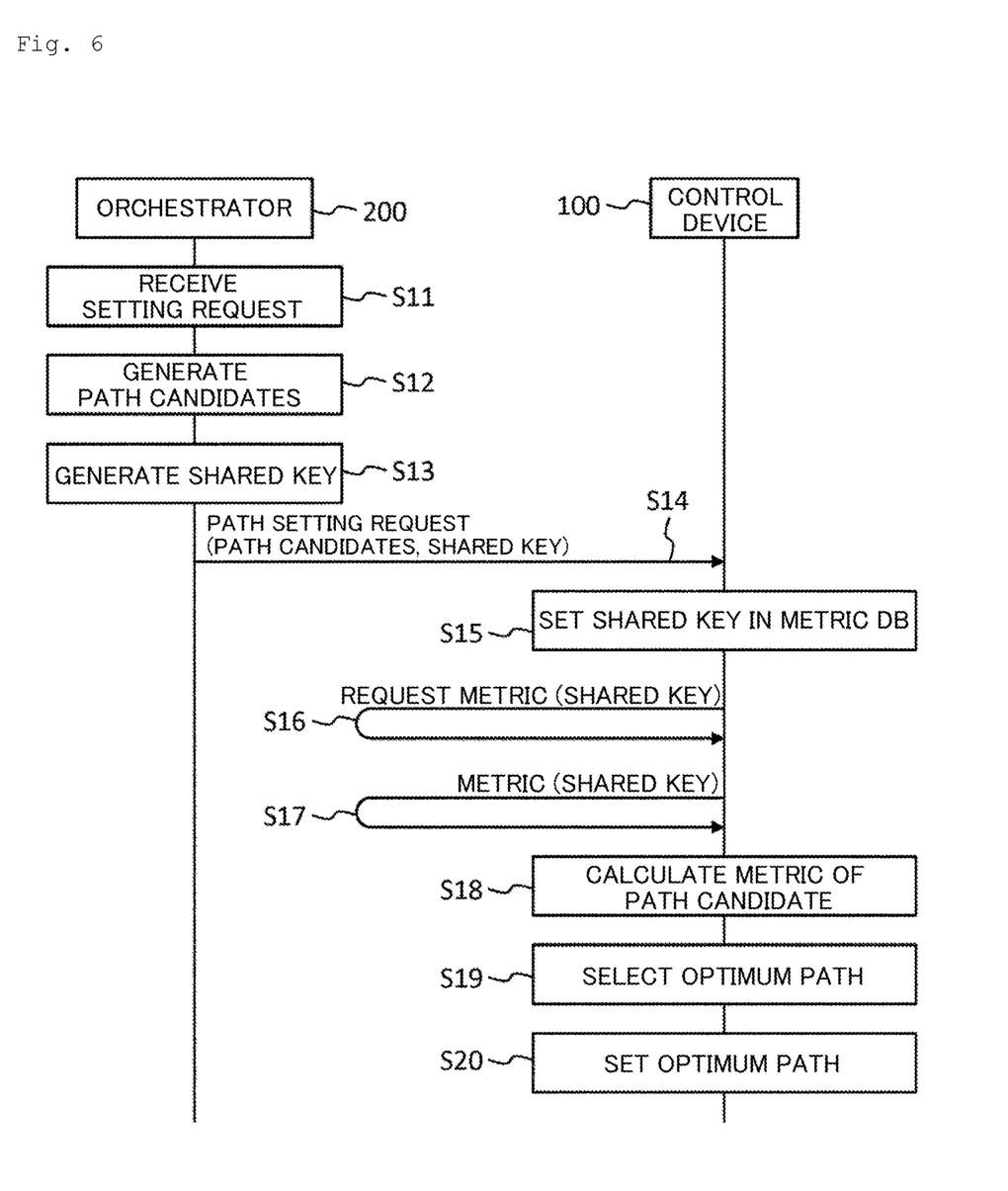
FIG. 6 is a sequence diagram of path setting processing according to the present embodiment.

FIG. 6 is a sequence diagram of path setting processing according to the present embodiment. In the following description, an example of setting of an end-to-end path connecting the user bases 453 and 454 (refer to FIG. 1) will be described.

In step S11, the request reception unit 211 of the orchestrator 200 receives an end-to-end path setting request. The setting request includes identification information of the domains 410 and 430 to which the user bases are connected and the nodes 411 and 433 that are user connection nodes.

In step S12, the path candidate generation unit 212 of the orchestrator 200 generates path candidates that are candidates for domains through which the path passes (path-passing domains). As the path candidates connecting the user bases 453 and 454, there are two path candidates, a path passing through the domains 410, 420, and 430 in order, and a path passing through the domains 410, 440, and 430 in order. The path candidate generation unit 212 generates the path candidates on the basis of domain connection information stored in the domain connection information 230 (refer to FIG. 2).

In step S13, the request transmission unit 213 of the orchestrator 200 generates a shared key (random number or the like) for each path candidate.

In step S14, the request transmission unit 213 transmits the path candidates, the shared key, and identification information of the nodes 411 and 433 which are user connection nodes to the control device 100 and requests path setting. The control device 100 of a transmission destination is a control device 100 of a domain included in any of the path candidates, and in the present description, the control devices 100A, 100B, 100C, and 100D.

In step S15, the request reception unit 111 of the control device 100 sets a shared key in the metric database 130 (denoted as the metric DB in FIG. 6). Specifically, the request reception unit 111 sets shared keys corresponding to the path candidates in the key 133 of the record of the metric database 130 corresponding to a partial path in the host domain in the path candidates. Hereinafter, the path candidates are domains 410, 420, and 430 and the shared key for these path candidates is described as f34ad3.

In the domain 410, it can be ascertained that the host domain is the first domain of the path candidates and an end point of the path candidates, and the host domain has a user connection node. The user connection node of the user base 453 is the node 411. Further, among the path candidates, the domain connection node of the domain 420, which is the domain next to the domain 410, which is the host domain, is the node 412 (refer to the record 148 in FIG. 5). The request reception unit 111 of the control device 100A of the domain 410 sets the shared key f34ad3 in the key 133 of the record of the metric database 130 in which the path 131 is the nodes 411 and 412 (refer to the record 139 in FIG. 4).

In the domain 420, the domain before the domain 420 which is the host domain is the domain 410, and the next domain is the domain 430. In the domain 420, the domain connection node for the domain 410 is the node 421, and the domain connection node for the domain 430 is the node 423 (refer to FIG. 1). The request reception unit 111 of the control device 100B of the domain 420 sets the shared key f34ad3 in the key 133 of the record of the metric database 130 in which the path 131 is the nodes 421 and 423.

In the domain 430, it can be ascertained that this host domain is the last domain of the path candidates and an end point of the path candidates, and the host domain has a user connection node. The user connection node of the user base 454 is the node 433. Further, among the path candidates, the domain connection node of the domain 420, which is the domain before the domain 430 that is the host domain, is the node 432. The request reception unit 111 of the control device 100C of the domain 430 sets the shared key f34ad3 in the key 133 of the record of the metric database 130 in which the path 131 is the nodes 432 and 433.

In the domain 440, the domains 410, 420, and 430 that are path candidates do not include the domain 440 which is the host domain, and thus a partial path is not present in the host domain. Therefore, it is not necessary to set the shared key in the metric database 130.

The request reception units 111 of the control devices 100A, 100B, 100C, and 100D perform the same processing for the domains 410, 440, and 430 which are other path candidates.

Referring back to FIG. 6, in step S16, the metric request unit 112 of the control device 100 transmits the shared key to the control device 100 of another domain included in any of the path candidates to request a metric of a path candidate in the other domain.

In step S17, the metric response unit 113 of the control device 100 refers to the metric database 130, associates the metric corresponding to the shared key with the shared key, and returns it to the control device 100 that is the request source to respond to the request. Upon receiving this response, each control device 100 has acquired the metric of a partial path of each domain included in the path candidates.

In step S18, the metric calculation unit 114 of the control device 100 obtains the sum of metrics of the partial path of the host domain and acquired partial paths for each path candidate to calculate a total metric of each path candidate.

In step S19, the path selection unit 115 of the control device 100 selects a path having the smallest total metric calculated in step S18 as an optimum path.

In step S20, the path setting unit 116 of the control device 100 sets the optimum path selected in step S19 for the nodes in the host domain. Further, the path setting unit 116 deletes the shared key of the path candidates stored in the metric database 130. If the host domain is not included in the optimum path, setting is unnecessary.

Features of Path Setting System

Each control device 100 calculates the total metric of path candidates generated by the orchestrator 200, determines an optimum path, and sets nodes such that the optimum path is configured. At the time of calculating metrics, the metric of a partial path in the domain of the corresponding control device 100 is acquired by inquiring of other control devices 100.

In path metric calculation and path setting at nodes, the control devices 100 perform autonomous and decentralized processing in cooperation, and the integrated control device of the conventional technology for controlling/arbitrating processing is unnecessary. Therefore, the path setting system 10 does not have a processing bottleneck point (device) or a single point of failure, and thus the overall configuration is simple and processing efficiency and reliability are improved.

Modified Example: Calculation of Metric

In the above embodiment, the total value of the metric of a partial path in each domain is used as a total metric, and an optimum path is determined on the basis of this total metric. On the other hand, an inter-domain metric (a metric between domain connection nodes connecting domains) may be added to the total metric. An inter-domain metric may be obtained from the control device 100 of either of two connected domains in metric acquisition (refer to steps S16 and S17 shown in FIG. 6), or all inter-domain metrics may be obtained in advance.

Modified Example: Priority Domain

In the above embodiment, a path with the smallest total metric is selected as an optimum path (refer to step S19 in FIG. 6). On the other hand, if a difference between total metrics is not more than a predetermined value, the path selection unit 115 may select a path candidate passing through a predetermined priority domain as an optimum path. The priority domain is designated at the time of requesting path setting and may be designated by the orchestrator 200. The priority domain may be determined according to the reliability, fee and the like of the domain.

Modified Example: Shared Key

In the above embodiment, the orchestrator 200 assigns a shared key for each path candidate (refer to step S13 in FIG. 6). On the other hand, a common shared key may be assigned. In this case, the metric response unit 113 returns a metric such that a metric of a partial path of a path candidate can be distinguished in step S17.

Modified Example: Metric Acquisition

In the above-described embodiment, the control device 100 requests and acquires a metric of a partial path in another domain (refer to steps S16 and S17 shown in FIG. 6). On the other hand, the control device 100 may transmit (push) the metric of the partial path to another control device 100 after receiving the path setting request in step S14.

Modified Example: Generation of Path Candidates

In the above embodiment, the orchestrator 200 generates path candidates with reference to the domain connection information 230 and transmits sends them to the control device 100. The control device 100 may store the domain connection information 230 and include the same path candidate generation unit as the path candidate generation unit 212 to generate path candidates. Specifically, the orchestrator 200 transfers a received setting request to the control device 100 of the domain that is an end point of any of paths corresponding to the received setting request. The control device 100 that has received the setting request generates path candidates on the basis of domain connection information and transmits the path candidates to the control devices 100 of the domains included in the path candidates. Subsequent processing is the same as that of the above-described embodiment. By performing processing in this way, it is possible to reduce the processing load of the orchestrator 200.

Although a path candidate is generated from the domain connection information 230 in the above-described embodiment and modified examples, it may be generated by other methods. For example, path candidates between two domains may be generated and stored in advance and may be referred to. A device different from the orchestrator 200 or the control device 100 may be used to acquire path candidates from a device that generates path candidates to generate path candidates.

Other Modified Examples

Although some embodiments of the present invention have been described above, these embodiments are merely examples and do not limit the technical scope of the present invention. The present invention can take various other embodiments, and various modifications such as omission and substitution can be made without departing from the gist of the present invention. These embodiments and modifications thereof are included in the scope and gist of the invention described in the present specification and the like and are also included in the scope of the invention described in the claims and the equivalent scope thereof.

Hardware Configuration

Figure 7:
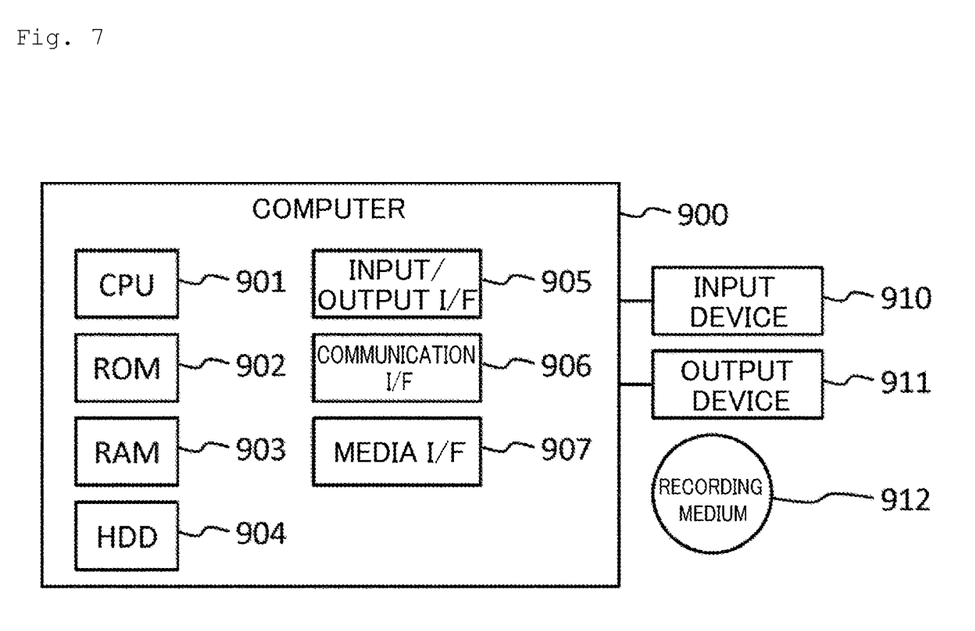
FIG. 7 is a hardware configuration diagram showing an example of a computer that realizes functions of the control device according to the present embodiment.

The control device 100 according to the present embodiment is realized by, for example, a computer 900 having a configuration as shown in FIG. 7. FIG. 7 is a hardware configuration diagram showing an example of the computer 900 that realizes the functions of the control device 100 according to the present embodiment. The computer 900 includes a CPU 901, a ROM 902, a RAM 903, an HDD 904, an input/output interface 905 (referred to as an input/output I/F in FIG. 7), a communication interface 906 (denoted as a communication I/F in FIG. 7), and a media interface 907 (denoted as a media I/F in FIG. 7).

The CPU 901 operates on the basis of a program stored in the ROM 902 or the HDD 904 and performs control by the control unit 110 (refer to FIG. 3). The ROM 902 stores a boot program executed by the CPU 901 when the computer 900 is started, a program related to the hardware of the computer 900, and the like.

The CPU 901 controls an input device 910 such as a mouse and a keyboard and an output device 911 such as a display and a printer via the input/output interface 905. The CPU 901 acquires data from the input device 910 and outputs generated data to the output device 911 via the input/output interface 905.

The HDD 904 stores programs executed by the CPU 901, data used by the programs, and the like. The communication interface 906 receives data from other devices (for example, the orchestrator 200 and nodes) which are not shown via a communication network, outputs the data to the CPU 901, and transmits data generated by the CPU 901 to other devices via the communication network.

The media interface 907 reads a program (refer to the program 121 shown in FIG. 3) or data stored in a recording medium 912 and outputs the data to the CPU 901 via the RAM 903. The CPU 901 loads the program from the recording medium 912 on the RAM 903 via the media interface 907 and executes the loaded program. The recording medium 912 is an optical recording medium such as a digital versatile disk (DVD), a magneto-optical recording medium such as a magneto-optical disk (MO), a magnetic recording medium, a conductor memory tape medium, a semiconductor memory, or the like.

For example, when the computer 900 serves as the control device 100 according to the present embodiment, the CPU 901 of the computer 900 realizes the function of the control device 100 by executing the program 121 (refer to FIG. 3) loaded on the RAM 903. The CPU 901 reads the program from the recording medium 912 and executes the program. In addition, the CPU 901 may read a program from another device via a communication network or may install the program 121 from the recording medium 912 to the HDD 904 and execute the program 121.

Effects

The effects of the path setting system 10 will be described below.

The path setting system 10 according to the present embodiment is a path setting system 10 including an orchestrator 200 that receives a request for setting a path passing through a network composed of a plurality of domains, and control devices 100 that control the domains, wherein the orchestrator 200 includes a path candidate generation unit 212 that generates path candidates corresponding to a line of domains through which paths that are candidates for the path pass, and a request transmission unit 213 that transmits the path candidates to control devices 100 of domains through which the path candidates pass to request setting of the path, and each of the control devices 100 includes a storage unit 120 that stores a metric database 130 in which a metric between two nodes among nodes (domain connection nodes)

within the host domain, which are connected to other domains, and nodes (user connection nodes) which are end points of the path is stored, a request reception unit 111 that receives a request from the request transmission unit 213, a metric request unit 112 that requests a metric between nodes through which the path candidates pass from the control device 100 of each domain through which the path candidates pass, a metric response unit 113 that responds to the request for the metric with a metric 132, a metric calculation unit 114 that calculates total metrics of the path candidates, a path selection unit 115 that selects an optimum path from the path candidates on the basis of the total metrics, and a path setting unit 116 that sets the optimum path for nodes through which the optimum path passes.

According to this path setting system 10, the control devices 100 perform autonomous and decentralized processing in cooperation, and thus the integrated control device of the conventional technology for controlling/arbitrating processing is unnecessary. Therefore, the path setting system 10 does not have a processing bottleneck point (device) or a single point of failure, and thus the overall configuration is simple, and processing efficiency and reliability are improved.

In the path setting system 10 according to the present embodiment, the request transmission unit 213 generates a key unique to the path or the path candidates, and transmits the key along with the path candidates, the request reception unit 111 sets the key 133 in the metric database 130 in association with the metric between the two nodes in the host domain through which the path candidates pass, the metric request unit 112 requests the metric by designating the key, and the metric response unit 113 acquires the metric 132 corresponding to the key from the metric database and responds with the metric 132.

According to this path setting system 10, it is possible to rapidly respond to a request for a metric by using a shared key (key 133) as an index and reducing the load of the control device 100.

In the path setting system 10 according to the present embodiment, the request transmission unit 213 transmits priority of the domains along with the path candidates, and the path selection unit 115 selects the optimum path on the basis of the total metrics of the path candidates and the priority of the domains.

According to this path setting system 10, it is possible to set a path that prioritizes not only a metric but also a priority domain.

The control device 100 according to the present embodiment is a control device 100 of a path setting system 10 including an orchestrator 200 that receives a request for setting a path passing through a network composed of a plurality of domains and control devices 100 that control the domains, and includes a storage unit that stores a metric database 130 in which a metric 132 between two nodes among nodes (domain connection nodes) within the host domain, which are connected to other domains, and nodes (user connection nodes) which are end points of the path is stored, a request reception unit 111 that receives a request for setting the path from the orchestrator 200, a path candidate generation unit that generates path candidates corresponding to a line of domains through which paths that are candidates for the path pass, a metric request unit 112 that requests a metric between nodes through which the path candidates pass from the control device 100 of each domain through which the path candidates pass, a metric response unit 113 that responds to the request for the metric with the corresponding metric, a metric calculation unit 114 that calculates total metrics of the path candidates, a path selection unit 115 that selects an optimum path from the path candidates on the basis of the total metrics, and a path setting unit 116 that sets the optimum path for nodes through which the optimum path passes.

According to this control device 100, the control devices 100 perform autonomous and decentralized processing in cooperation, and thus the integrated control device of the conventional technology for controlling/arbitrating processing is unnecessary. Therefore, the path setting system 10 does not have a processing bottleneck point (device) or a single point of failure, and thus the overall configuration is simple, and processing efficiency and reliability are improved. Further, processing of the orchestrator 200 is further reduced than that of the orchestrator 200 of the path setting system 10 described above.

REFERENCE SIGNS LIST

10 Path setting system
100, 100A, 100B, 100C, 100D Control device
111 Request reception unit
112 Metric request unit
113 Metric response unit
114 Metric calculation unit
115 Path selection unit
116 Path setting unit
130 Metric database
132 Metric
200 Orchestrator
211 Request reception unit
212 Path candidate generation unit
213 Request transmission unit
230 Domain connection information (connection information between domains)
410, 420, 430, 440 Domain
411, 433 Node (user connection node)
412, 413, 421, 422, 423, 431, 432, 441, 442, 443 Node (domain connection node)
453, 454 User base

The invention claimed is:

1. A path setting system comprising:
an orchestrator, comprising one or more processors, configured to:
  receive a request for setting a path passing through a network comprising of a plurality of domains;
  generate path candidates corresponding to a line of one or more domains of a plurality of domains through which paths that are candidates for the path pass;
  generate a key unique to each path candidate of the path candidates;
  transmit, to one or more control devices of the one or more domains, data indicative of the path candidates and the key unique to each path candidates; and
each control device of the plurality of control devices controls a respective domain of the plurality of domains, the control device comprises one or more processors configured to:
  store a metric database in which a metric between two nodes among nodes within a host domain, which are connected to other domains, and nodes which are end points of the path is stored;
  receive, from the orchestrator, the data indicative of the path candidates and the key unique to each path candidate of the path candidates;
  transmit, to the control device of each other domain through which the path candidates pass, a request for a metric between the nodes through which the path candidates pass, the request comprising the key unique to each of the path candidates;

respond to the request for the metric with the metric;

calculate total metrics of the path candidates;

select an optimum path from the path candidates on the basis of the total metrics; and set the optimum path for nodes through which the optimum path passes.

2. The path setting system according to claim 1, the control device is configured to:

set the key in the metric database in association with the metric between the two nodes in the host domain through which the path candidates pass; and acquire the metric corresponding to the key from the metric database and responds with the metric.

3. The path setting system according to claim 1, the control device is configured to:

transmit priority of the domains along with the path candidates; and select the optimum path on the basis of the total metrics of the path candidates and the priority of the domains.

4. A control device of a path setting system including an orchestrator that receives a request for setting a path passing through a network composed of a plurality of domains, and control devices that controls each domain, the control device comprising:

a storage unit that stores a metric database in which a metric between two nodes among nodes within a host domain, which are connected to other domains, and nodes which are end points of the path is stored; and one or more processors configured to:

receive, from the orchestrator, data indicative of path candidates and a key unique to each path candidate of path candidates, wherein each path candidate corresponds to a line of the domains through which paths that are candidates for the path pass;

transmit, to the control device of each other domain through which the path candidates pass, a request for a metric between the nodes through which the path candidates pass, the request comprising the key unique to each of the path candidates;

respond to the request for the metric with a metric;

calculate total metrics of the path candidates;

select an optimum path from the path candidates on the basis of the total metrics; and set the optimum path for nodes through which the optimum path passes.

5. A path setting method of a path setting system comprising:

receiving, by an orchestrator, a request for setting a path passing through a network comprising of a plurality of domains;

generating, by the orchestrator, path candidates corresponding to a line of one or more domains of a plurality of domains through which paths that are candidates for the path pass;

generating, by the orchestrator, a key unique to each path candidate of the path candidates;

transmitting, by the orchestrator and to one or more control devices of the one or more domains, data indicative of the path candidates and the key unique to each path candidate, wherein each control device of the plurality control devices controls a respective domain of the plurality of domains;

storing, by a storage unit, a metric database in which a metric between two nodes among nodes within a host domain, which are connected to other domains; and nodes which are end points of the path is stored;

receiving, by each of the control devices and from the orchestrator, the data indicative of the path candidates and the key unique to each path candidate of the path candidates;

transmitting, by each of the control devices and to the control device of each other domain through which the path candidates pass, a request for a metric between the nodes through which the path candidates pass, the request comprising the key unique to each of the path candidates;

responding, by each of the control devices, to the request for the metric with the metric;

calculating, by each of the control devices, total metrics of the path candidates;

selecting, by each of the control devices, an optimum path from the path candidates on the basis of the total metrics; and setting, by each of the control devices, the optimum path for nodes through which the optimum path passes.

* * * * *